United States Patent
Ozaki

(10) Patent No.: US 7,057,749 B2
(45) Date of Patent: Jun. 6, 2006

(54) IMAGE PROCESSING APPARATUS AND METHOD FOR GENERATING A PRINT JOB HAVING A PLURALITY OF OUTPUT FORMATS TO BE PRINTED

(75) Inventor: Hiroshi Ozaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 872 days.

(21) Appl. No.: 10/020,230

(22) Filed: Dec. 18, 2001

(65) Prior Publication Data

US 2002/0075498 A1    Jun. 20, 2002

(30) Foreign Application Priority Data

Dec. 20, 2000 (JP) .............................. 2000-387112
Sep. 28, 2001 (JP) .............................. 2001-298744

(51) Int. Cl.
G06F 3/12 (2006.01)
G06K 1/00 (2006.01)

(52) U.S. Cl. .................... 358/1.13; 358/1.15; 358/1.18

(58) Field of Classification Search .............. 358/1.11, 358/1.12, 1.13, 1.18, 1.15
See application file for complete search history.

(56) References Cited

U.S. PATENT DOCUMENTS 5,481,353 A * 1/1996 Hicks et al. ................ 399/382
5,809,392 A * 9/1998 Tabuchi et al. ............. 399/405
2003/0103237 A1* 6/2003 Han .......................... 358/1.18

FOREIGN PATENT DOCUMENTS

JP         10-322487         12/1998

OTHER PUBLICATIONS

U.S. Appl. No. 09/839,158, filed Apr. 23, 2001.
U.S. Appl. No. 08/425,473, filed Apr. 20, 1995.

* cited by examiner

Primary Examiner—Kimberly Williams
Assistant Examiner—Dillon Murphy
(74) Attorney, Agent, or Firm—Fitzpatrick, Cella, Harper & Scinto

(57) ABSTRACT

An information processing apparatus allows a user to obtain copies printed in a plurality of desired formats by performing a setting operation only once without having to further perform a complicated operation. Property information specifying the manner in which data is to be printed is set via setting means. Thereafter, if a special printing mode is not specified by special-printing-mode specifying means, first print property information describing the manner in which data is to be printed on a first recording sheet is generated by print property information generating means in accordance with the property information set by the setting means. However, if the special printing mode is specified, in addition to the first print property information, second print property information describing the manner in which data is to be printed on a second recording sheet is generated by the print property information generating means.

23 Claims, 9 Drawing Sheets

FIG. 5

| CANON PRINT JOB = START | JOB START COMMAND | 501 |

USER = Canon

NAME = Output

---

BIND1 = START      BIND1 START COMMAND    502

BIND_MEDIATYPE = NORMAL

BIND_COPIES = 10

BIND NUP = 1

STAPLE = ON

DUPLEX = ON

---

PRINT DATA    503

---

BIND1 = END      BIND1 END COMMAND    504

CANON PRINT JOB = END      JOB END COMMAND    505

PRINT JOB 500

FIG. 7
PRINT DATA TRANSMITTED FROM PC 701
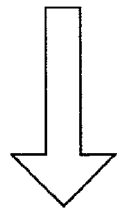
ONE SET OF OHP TRANSPARENCY SHEETS
ON WHICH THE DATA HAS BEEN PRINTED 702
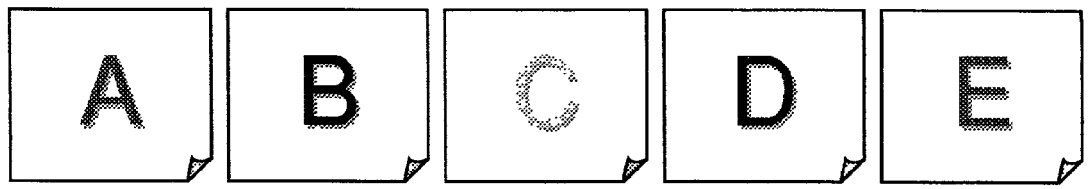
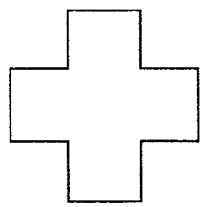
A SPECIFIED NUMBER OF SETS OF
PRINTED DOCUMENTS FOR DISTRIBUTION 703
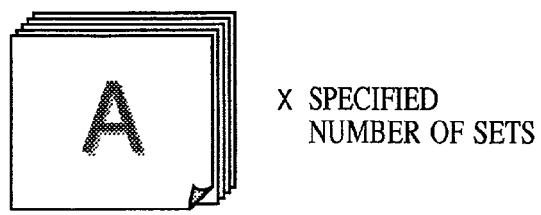
X SPECIFIED NUMBER OF SETS

FIG. 10

STORAGE MEDIUM SUCH AS A FD OR CD-ROM

| DIRECTORY INFORMATION |
|---|
| FIRST DATA PROCESSING PROGRAM INCLUDING PROGRAM CODES CORRESPONDING TO THE RESPECTIVE STEPS SHOWN IN THE FLOW CHART OF FIG. 8 |
| SECOND DATA PROCESSING PROGRAM INCLUDING PROGRAM CODES CORRESPONDING TO THE RESPECTIVE STEPS SHOWN IN THE FLOW CHART OF FIG. 9 |
| |

IMAGE PROCESSING APPARATUS AND METHOD FOR GENERATING A PRINT JOB HAVING A PLURALITY OF OUTPUT FORMATS TO BE PRINTED

BACKGROUND OF THE INVENTION

1. Field of the Invention

The present invention relates to an information processing apparatus for generating print data to be printed by a printer, data processing method, data processing program, and a storage medium.

2. Description of the Related Art

In a conventional information processing apparatus, when printing onto different types of print media using an application program running on a computer, it is required to perform printing as many times as the number of types of print media, and it is required to specify the type of print media each time printing is performed.

For example, in the case where a document is first printed on Over Head Projector (OHP) transparency sheets which are to be used by a presenter in a presentation and then printed, collated and stapled on sheets of standard paper (e.g., opaque recording sheets) for distribution to participants at the presentation, printing on OHP transparency sheets is first performed in a "Staple-Off" mode, and then, after changing the setting of a printer driver or application software from the "Staple-Off" mode into a "Staple-On" mode, printing on standard sheets of paper is performed to obtain sets of documents to be distributed.

That is, when printing is performed to make copies on different types of recording media, it is required to execute different jobs, even if the same print information (image information) is being printed. For example, when printing is performed to create one copy on OHP transparency sheets and a plurality of copies on another type of media into a stapled final form, it is required to separately execute respective jobs. That requires a user to perform many complicated operations to obtain differently formatted printed output.

One technique for solving the above problem is disclosed in Japanese Patent Application No. 2000-127751 (corresponding to U.S. patent application Ser. No. 09/839,158) filed by the present applicant. Japanese Patent Application No. 2000-127751 discloses an information processing apparatus and an interface which make it easier to print in different formats from the same print data. More specifically, it becomes possible to easily make settings for printing on OHP transparency sheets used with overhead projectors at presentations and also settings for printing on sheets for use of distribution.

Although this technique advantageously copies in different formats by issuing a print start command only once, unlike the conventional technique in which it is required to execute multiple jobs, there are still complicated setting operations to be performed for each format.

SUMMARY OF THE INVENTION

In view of the above, it is an object of the present invention to provide an information processing apparatus, a method of performing data processing using the information processing apparatus, a data processing program, and a storage medium including the data processing program stored thereon, which allow a user to obtain copies printed in different desired formats by making settings only once without having to perform complicated operations.

According to an aspect of the present invention, to achieve the above objects, there is provided an information processing apparatus for generating print data to be printed by a printer, wherein the information processing apparatus comprises setting means for setting a print property specifying a manner in which the print data is to be printed; special-printing-mode specifying means for specifying a special printing mode; and print property information generating means for generating print property information such that when the special printing mode is not selected, the print property information generating means generates, in accordance with the setting made by the setting means, first print property information specifying a manner in which printing is performed on a first recording sheet, whereas when the special printing mode is selected, the print property information generating means generates, in addition to the first print property information, second print property information specifying a manner in which printing is performed on a second recording sheet.

Further objects, features and advantages of the present invention will become apparent from the following description of the preferred embodiments with reference to the attached drawings.

BRIEF DESCRIPTION OF THE DRAWINGS

FIG. 5 is a diagram illustrating an example of the content of print data produced by a host computer shown in FIG. 1.

FIG. 7 is a diagram illustrating an example of a manner in which data is printed by a printer shown in FIG. 1.

FIG. 10 is a schematic representation of a memory map of a storage medium including various data processing programs stored thereon and readable by a printing system realized by applying an information processing apparatus according to the present invention.

DESCRIPTION OF THE PREFERRED EMBODIMENTS

The present invention is described in further detail below with reference to preferred embodiments in conjunction with the accompanying drawings.

Figure 1:
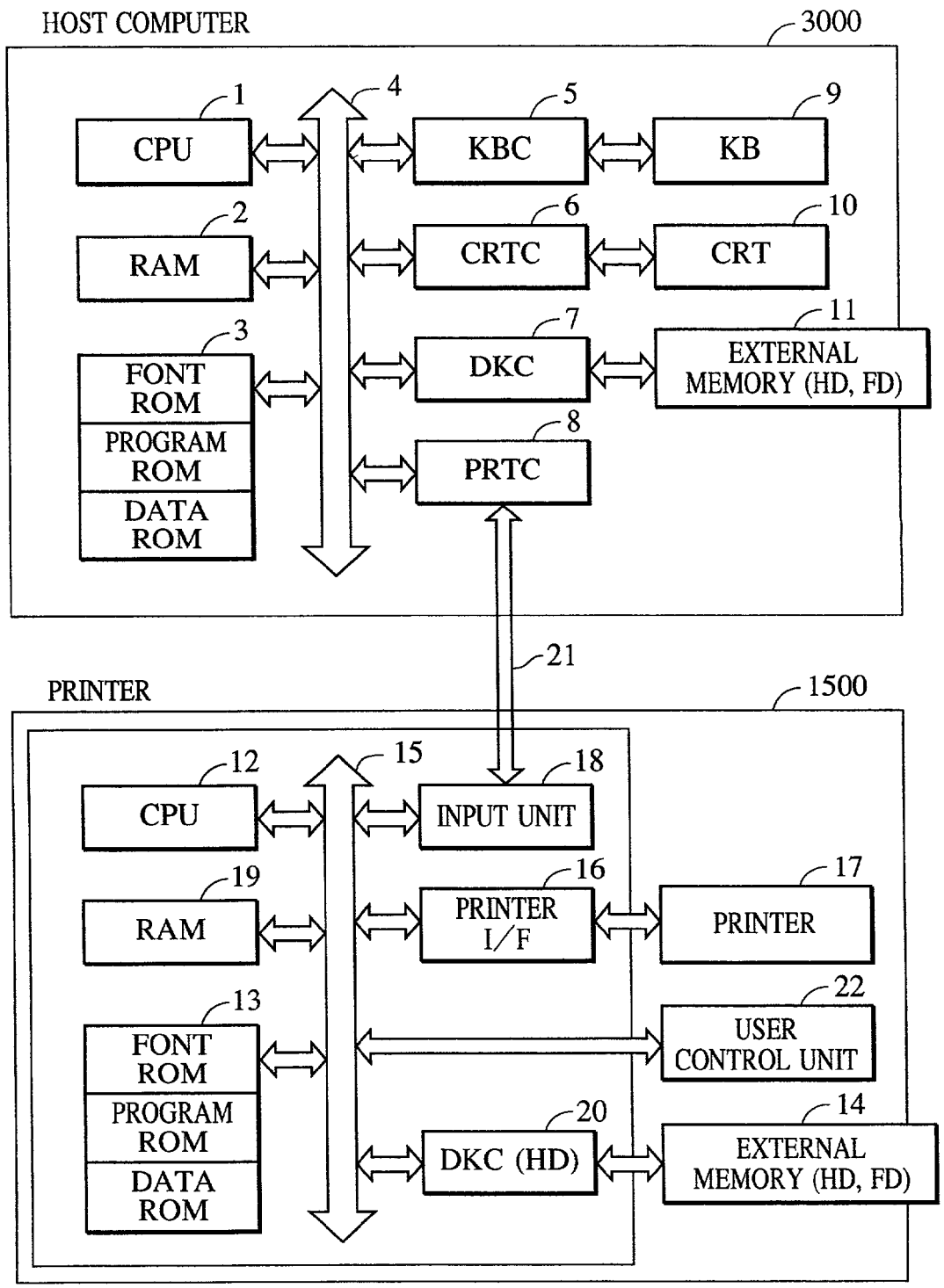
FIG. 1 is a block diagram illustrating a printer control system realized by applying an embodiment of an information processing apparatus according to the present invention.

FIG. 1 is a block diagram illustrating a printer control system realized by applying an embodiment of an information processing apparatus according to the present invention. Note that the present invention may be applied to a single apparatus, a system including a plurality of apparatuses, or a system including a plurality of apparatuses connected to one another via a network such as a LAN or a WAN, as long as each apparatus and/or the system is capable of executing a function according to the present invention, unless otherwise stated.

In FIG. 1, reference numeral 3000 denotes a host computer including a CPU 1 for processing document data including a mixture of graphic, image, character, and table (such as a spreadsheet) data stored in a program ROM portion of a ROM 3 or in an external memory 11.

The CPU 1 also controls respective devices connected to a system bus 4. An operating system (OS) program for controlling the CPU 1 is stored in the program ROM portion in the ROM 3 or in the external memory 11. Font data used in the document processing is stored in a font ROM portion in the ROM 3 or in the external memory 11. Various data used in the document processing are stored in a data ROM in the ROM 3 or in the external memory 11.

A RAM 2 is used by the CPU 1 as a main memory or a work area. A keyboard controller (KBC) 5 controls an input operation performed via a keyboard (KB) 9 or a pointing device (not shown).

A CRT controller (CRTC) 6 controls a display operation of a CRT display (CRT) 10. A disk controller (DKC) 7 controls access to the external memory 11 such as a hard disk (HD) or a floppy disk (FD) on which a boot program, various applications, font data, a user file, an edit file, a program for generating a printer control command (hereinafter referred to as a printer driver) and the like are stored.

A printer controller (PRTC) 8 connected to a printer 1500 via a bidirectional interface 21 serves to control communication with the printer 1500.

The CPU 1 also controls converting (rasterizing) display information into outline font data in the RAM 2 so that the information is displayed in a WYSIWYG fashion on the CRT 10.

The CPU 1 opens one or more windows in response to a command issued by clicking a mouse cursor (not shown) displayed on the CRT 10 and executes specified data processing. Before executing a printing operation, a user can open a printer configuration window to configure settings associated with the printer, select a printing mode, and configure settings associated with the printer driver.

In the printer 1500, a printer CPU 12 outputs an image signal having output information for a printing unit (printer engine) 17 connected to a system bus 15 in accordance with a control program stored in the program ROM portion in the ROM 13 or a control program stored in an external memory 14. The printing unit 17 is connected to the system bus 15 via a printing unit interface 16.

The program ROM portion in the ROM 13 stores the control program or the like used by the CPU 12. A font ROM portion of the ROM 13 stores font data or the like which is used to generate the output information. If a printer does not have external memory 14 such as a hard disk, then a data ROM portion in the ROM 13 is used to store information used by the host computer 3000.

The CPU 12 may communicate with the host computer 3000 via an input unit 18 to transmit information from the printer 1500 to the host computer 3000.

A RAM 19 is used by the CPU 12 as a main memory or a work area. The storage capacity of the RAM 19 can be increased by attaching an optional RAM to an extension port.

The RAM 19 is also used as an output information storage area, an environment data storage area, and an NVRAM (Non-Volatile Random Access Memory).

Accessing external memory 14 such as a hard disk (HD) or an IC card is controlled by a memory controller (DKC) 20. The external memory 14 can also be adapted to store data such as font data, an emulation program, or form data.

On a user control panel 22, there are disposed operation control devices such as a switch and an LED indicator. The number of external memories is not limited to one. Two or more external memories may be connected to store, in addition to the built-in font, optional font data, a program for interpreting a printer control language for a different language, or the like. Furthermore, there may also be provided an NVRAM (not shown) for storing printer mode setting information input via the user control panel 22.

Figure 2:
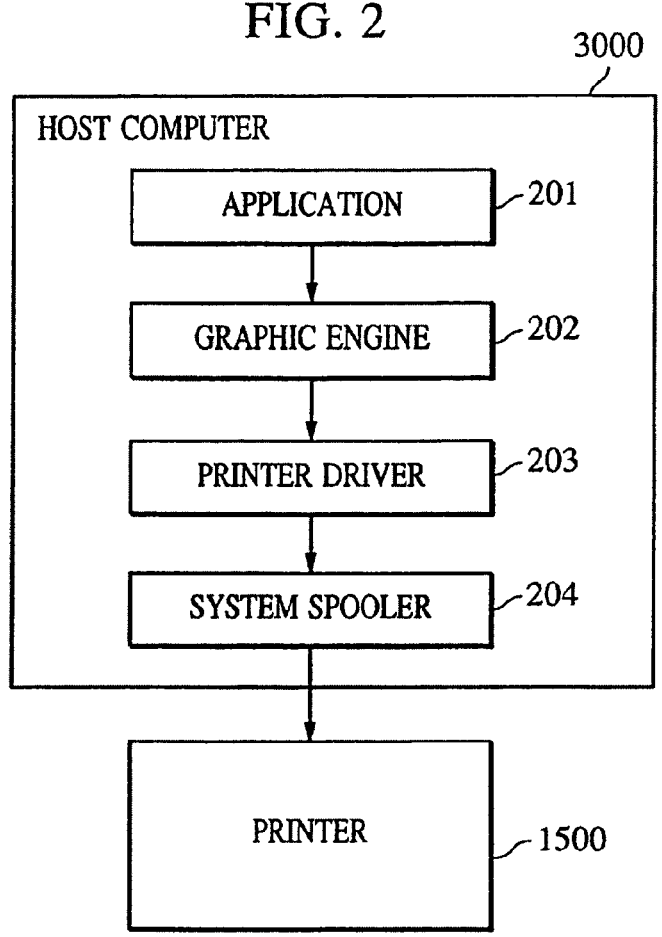
FIG. 2 is a block diagram illustrating the construction of a program used by the printer control system shown in FIG. 1.

FIG. 2 is a block diagram illustrating the construction of a program used by the printer control system shown in FIG. 1. In FIG. 2, similar parts to those in FIG. 1 are denoted by similar reference numerals. Note that FIG. 2 illustrates typical printing modules (program modules) of the host computer 3000 which is connected directly, or indirectly via a network, to a printing apparatus such as a printer 1500.

In FIG. 2, an application 201, a graphic engine 202, a printer driver 203, and a system spooler 204 are program modules which are stored in the form of files in the external memory 11 shown in FIG. 1. These modules are loaded into the RAM 2 when executed by the OS or another module.

The application 201 and the printer driver 203 may be installed on the external memory 11 such as a HD via an external memory such as a floppy disk or a CD ROM (not shown) or via a network (not shown).

The application 201 stored in the external memory 11 is executed after being loaded into the RAM 2. When the application 201 performs a printing operation using the printer 1500, print data is output via the graphic engine 202 loaded in the RAM 2.

The graphic engine 202 loads the printer driver 203 prepared for each printer into the RAM 2 from the external memory 11 and converts the data output from the application 201 into a printer control command using the printer driver 203. The resultant printer control command is output via the interface 21 to the printer 1500 by the system spooler 204 loaded by the OS into the RAM 2.

Figure 3:
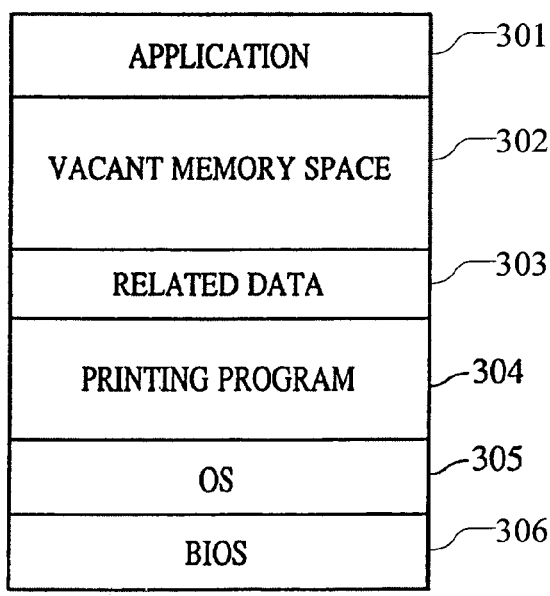
FIG. 3 is a schematic diagram illustrating a memory map of a RAM shown in FIG. 1.

FIG. 3 shows an example of a memory map of the RAM 2 shown in FIG. 1. In this specific example, the memory map shows a state obtained by loading the printing program according to the present embodiment in an executable form into the RAM 2 of the host computer 3000.

Reference numeral 301 denotes a memory area in the RAM 2 used by an application. Reference numeral 303 denotes an area in which data used by the host computer 3000 is stored. Reference numeral 302 denotes vacant memory space. Reference numeral 305 denotes a Basic Input/Output System (BIOS). Reference numeral 306 denotes an area in which are stored programs for controlling peripheral devices, such as a disk drive, a keyboard, a video board, connected to the host computer 3000.

Note that in the present embodiment, the print control program is a part of the printing program 304.

Figure 4:
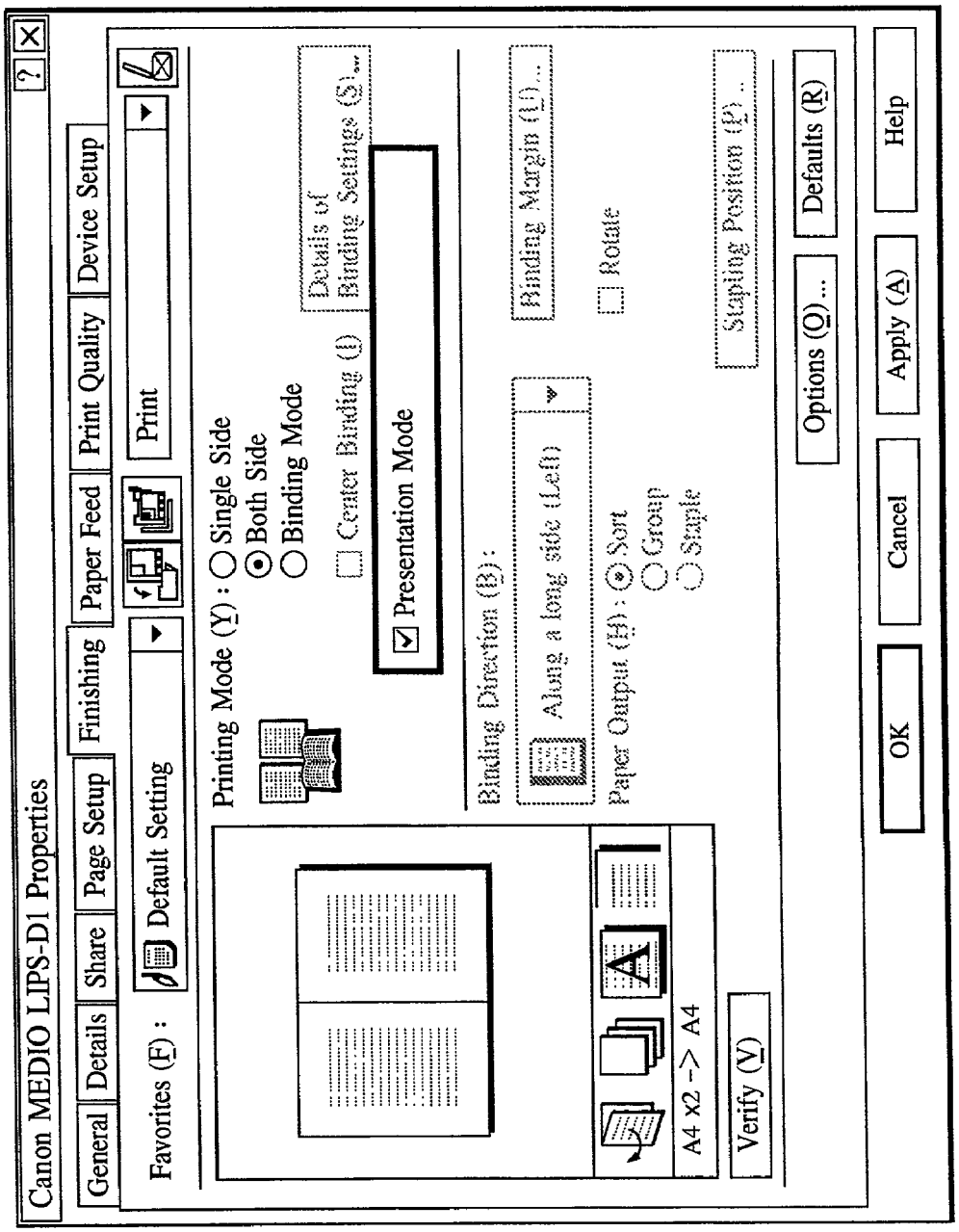
FIG. 4 is a diagram illustrating an example of a property setting dialog box for setting properties of a printer, displayed on the screen of a CRT display shown in FIG. 1.

FIG. 4 illustrates an example of a property setting dialog box which is displayed on the screen of the CRT 10 shown in FIG. 1, for use by a user to make various settings associated with the presentation mode according to the present embodiment.

Printing in the presentation mode (special printing mode) refers to a printing operation in which printing is performed on one or more transparency sheets for use with an Over Head Projector (OHP) in accordance with print data output from the application 201 and then printing is performed on one or more sheets of standard paper (opaque recording sheets) in a desired printing format in accordance with the same print data. That is, in the presentation mode, printing is performed on both OHP transparency sheets for use by a presenter in a presentation and on sheets of standard paper for distributing to participants.

Although the presentation mode according to the present embodiment is defined in the above-described manner, the types of sheets and the printing format are not limited to those described above.

The manner of configuring the settings for the presentation mode is described below with reference to FIG. 4. First, a user makes settings (by turning on/off the stapling mode, selecting a single-sided or a double-sided printing mode, specifying the number of pages per sheet, turning on/off the binding mode, and specifying the number of copies) via a printer driver setting dialog box such that copies for distribution will be obtained in a desired form.

If the user then selects a presentation mode (by operating a pointing device (not shown) so as to turn on a presentation mode check box, the presentation mode is activated.

Figure 6:
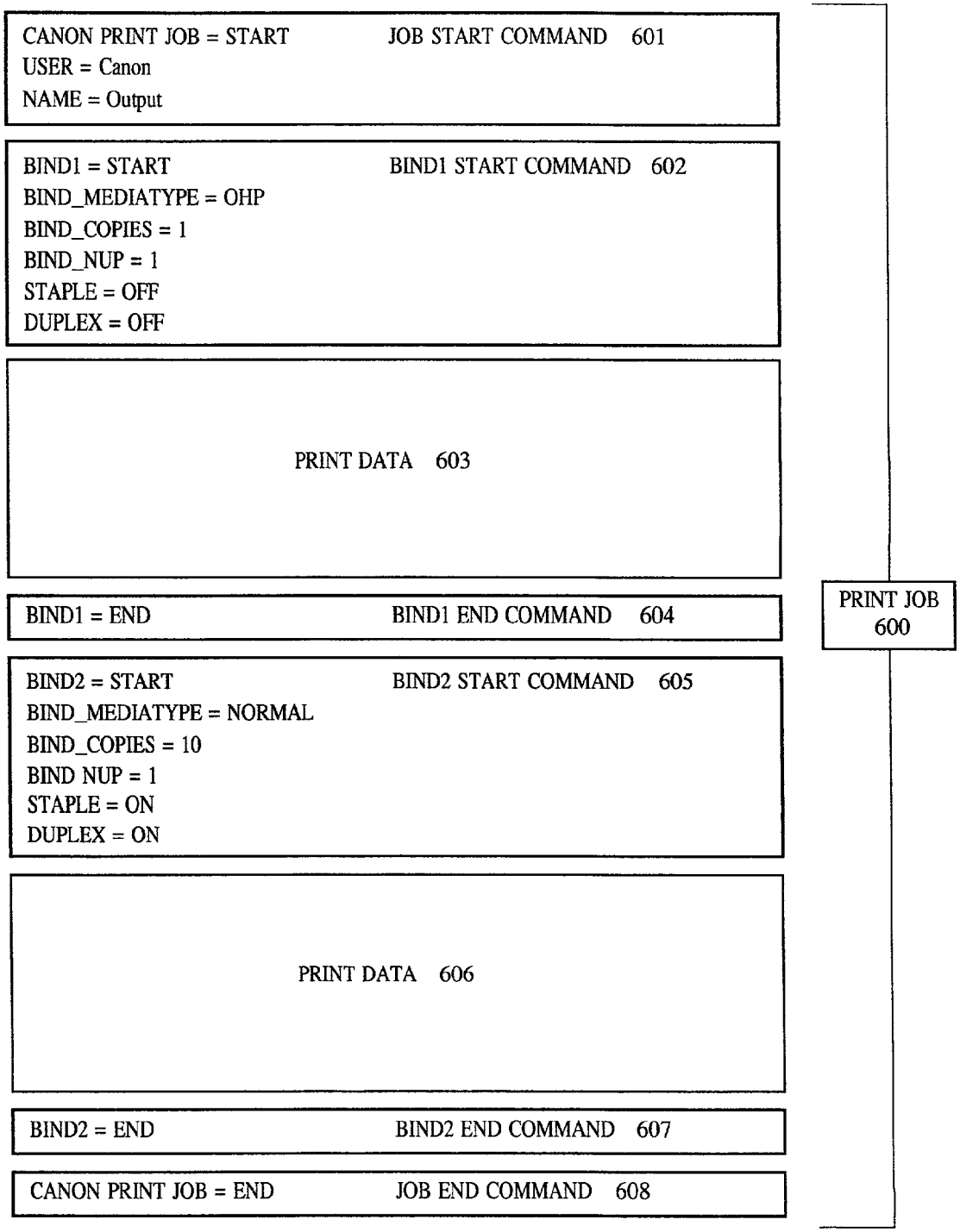
FIG. 6 is a diagram illustrating an example of the content of print data produced by the host computer shown in FIG. 1.

FIGS. 5 and 6 illustrate examples of the content of print jobs which are transmitted to the printer after being generated by the host computer 3000 shown in FIG. 1.

FIG. 5 illustrates an example of content of a print job generated in the normal printing mode, and FIG. 6 illustrates an example of content of a print job generated when the presentation mode is selected. In the following description of the present embodiment, a BIND command is used. However, it should be noted that the name, "BIND", of this command does not have a particular meaning and this command may be any proper command for setting a print property so as to print the print data in a desired form.

The print data refers to data described by the printer driver 203 using a printer language depending upon the device so as to represent how to print data such as text data or image data produced by an application or the like on the host computer 3000. Specific examples of printer languages include LIPSIV (registered trademark) and PCL5e (registered trademark). For a device such as a printer server which cannot interpret the printer language, the print data looks like a black box. The content of the print data is not interpreted by the printer server but is interpreted by the printer when it is printed As shown in FIG. 5, the print job 500 includes a job start command 501, a BIND1 start command 502, a BIND1 end command 504, a print data procedure 503, and a job end command 505.

On the other hand, as shown in FIG. 6, the print job 600 includes a job start command 601, a BIND1 start command 602, print data 603, a BIND1 end command 604, a BIND2 start command 605, a print data procedure 606, a BIND2 end command 607, and a job end command 608.

FIG. 7 is a diagram illustrating an example of how data is printed by the printer 1500 shown in FIG. 1. As shown in FIG. 7, data produced by the application 201 executed by the host computer 3000 is converted, by the printer driver 203, into print data such as print job 600 shown in FIG. 6 in which the setting in the presentation mode is reflected. The resultant print data is transmitted from the host computer 3000 to the printer 1500, which performs printing in accordance with the received print data as shown in FIG. 7.

In FIG. 7, reference numeral 701 denotes data including, for example, 5 pages generated by the application 201 in the presentation mode. Reference numeral 702 represents the manner in which printing is performed on OHP transparency sheets in accordance with the data 701, and reference numeral 703 represents the manner in which printing is performed, in accordance with the same data, on sheets of standard paper to create copies for distribution.

To perform printing using the conventional technique described earlier, first the printer driver 203 of the host computer 3000 is set to print on OHP transparency sheets, and then to transmit a print job to the printer 1500, thereby performing printing on OHP transparency sheets. Thereafter, a print job is again transmitted to the printer 1500 after changing the setting for printing on sheets of standard paper for distribution, and printing is performed on sheets of standard paper. (Printing may be performed first on sheets of standard paper then on OHP transparency sheets.) Thus, a user has to do multiple and troublesome operations.

On the other hand, in the present embodiment, if a user simply selects the presentation mode and configures the settings necessary to obtain printed documents for distribution, a print job is automatically generated which includes print data with print property information specifying that printing is to be performed on OHP transparency sheets and print data with print property information specifying that printing is to be performed on sheets of standard paper for distribution. Thus, the user does not need to make separate settings for printing on sheets for distribution and sheets for presentation, and a great improvement in operability is achieved.

Referring to FIGS. 1, 2, and 3, a process performed by the host computer 3000 to produce data in accordance with the present embodiment is described below. Production of data is performed under the control of the OS 305 as follows. A user specifies a printer to be used and sets print property, as descried above, via the keyboard controller KBC5 and the application 201 being running. The information given by the user is temporality stored in the RAM 2. Thereafter, if the user issues a print start command, production of print data is started.

Figure 8:
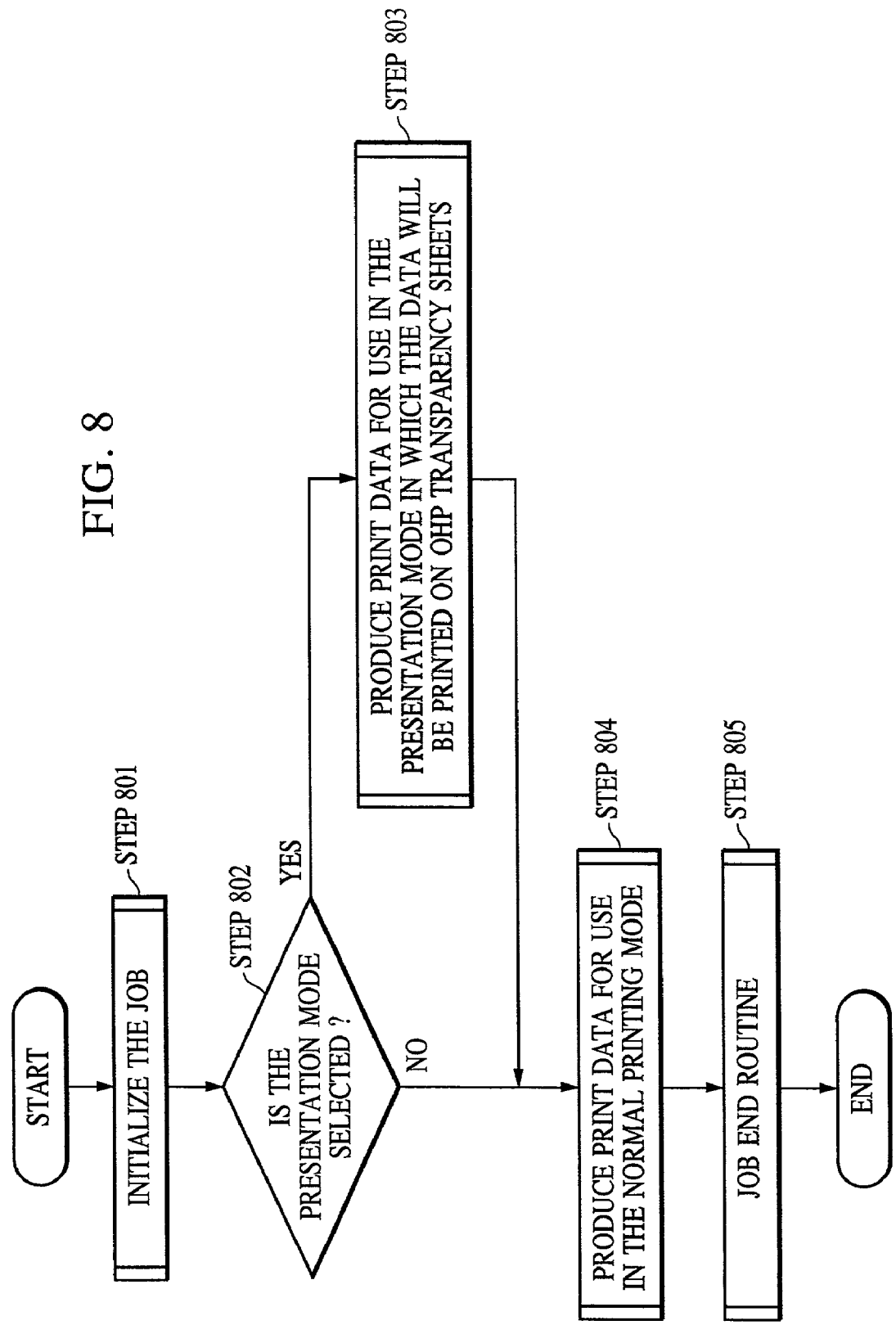
FIG. 8 is a flowchart illustrating an example of a first data processing procedure performed by the information processing apparatus according to the present invention.
Figure 9:
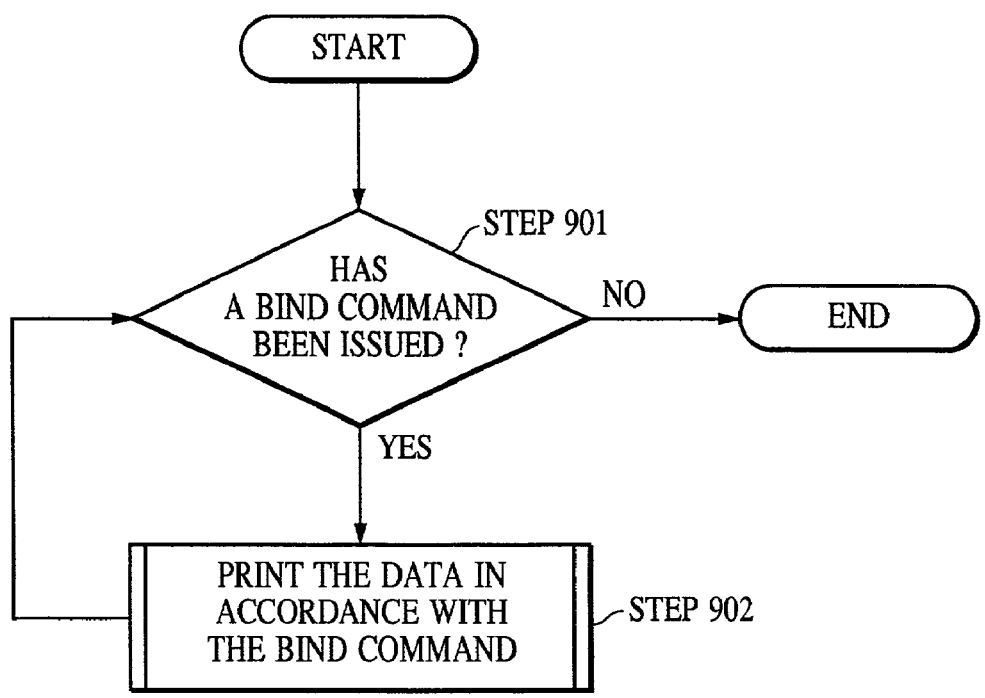
FIG. 9 is a flowchart illustrating an example of a data processing procedure performed by a print control apparatus according to the present invention.

FIGS. 8 and 9 are flow charts showing process flow for the case where a special finishing process is included in the specified printing format. The data processing according to the present embodiment includes two processes: a process in which data is generated by the host computer 3000; and a process in which the printer 1500 receives the data generated by the host computer 3000 and performs printing in a specified finishing format.

First, the process in which data is generated by the host computer 3000 is described with reference to FIG. 8.

FIG. 8 is a flowchart illustrating an example of the data processing procedure performed by the information processing apparatus according to the present invention. More specifically, the data processing shown in FIG. 8 is print data processing performed by the host computer 3000 in accordance with the present embodiment.

After generation of print data is started in response to a print execution command issued by the application 201 shown in FIG. 2, the printer driver 203 performs a job initialization (step 801). More specifically, the OS acquires a document name, a user name, a printer name to which the print data is to be output, which are specified by the application, and DEVMODE (printer setting structure) in which the setting of the printer driver is described.

The CPU 1 then determines whether the presentation mode is selected (step 802). As described above with reference to FIG. 4, configuration of the presentation mode is set by a user via the dialog box for setting the printer driver 203 such that, after selecting the presentation mode, printing conditions for obtaining copies for distribution are specified (by turning on/off the stapling mode, selecting a single-sided or a double-sided printing mode, specifying the number of pages per sheet, turning on/off the binding mode, and specifying the number of copies).

If the CPU 1 determines that the presentation mode is not selected (that is, if the answer of step 802 is "no"), print data and a print property setting command are generated in accordance with the format set by the driver 203 (step 804). That is, a print job 500 is generated as shown in FIG. 5.

On the other hand, in the case where the CPU 1 determines that the presentation mode is selected (that is, if the answer of step 802 is "yes"), a command including print property information is automatically generated such that printing will be performed in a manner suitable for printing on OHP transparency sheets (more specifically, in the case of the present embodiment, the number of copies is set to 1, the number of pages per sheet is set to 1, no-stapling mode is selected, and the single-sided printing mode is selected) regardless of the setting of the driver 203 in terms of the printing format (step 803). Thereafter, in step 804, print data and a print property setting command are generated, that is, the print job 600 shown in FIG. 6 is generated, to create documents for distribution in accordance with the settings of the driver 203.

Finally, a job end routine is performed (step 805). Thus, the whole print data processing completed.

In the example shown in FIG. 6, the BIND1 start command 602 is a job control command which is generated when the presentation mode is selected. "BIND_MEDIATYPE=OHP" is a setting command specifying an OHP transparency sheet as a recording sheet. "BIND_COPIES=1" is a setting command indicating that the number of copies is equal to one. "BIND_NUP=1" is a setting command indicating that the number of pages per sheet is equal to one. "STAPLE=OFF" is a setting command indicating that printed sheets are not stapled. "DUPLEX=OFF" is a setting command indicating that printing should be performed on one side of each sheet.

The print job produced by the host computer 3000 via the process described above is sent to the printer 1500 via an interface 21 serving as data transfer means shown in FIG. 1.

The host computer 3000 and the printer 1500 may be formed in a single unit. In this case, the data transfer means may be an internal bus. In the case where the printer 1500 and the host computer 3000 are disposed separately, the data transfer means may be an external interface such as a Centronics interface, USB (Universal Serial Bus), P1394, or a network.

When the printing process requested by the application 201 is completed, the printing program according to the present embodiment is completed and deleted from the RAM 2 by the OS 305.

The printing process performed by the printer 1500 is now described below with reference to the flow chart shown in FIG. 9.

FIG. 9 is a flowchart illustrating an example of the data processing procedure performed by the printer, according to the present invention. More specifically, the data processing procedure performed herein corresponds to a print job including one or more BIND commands.

By way of example, 5-page print data produced by the host computer 3000 such as that denoted by reference numeral 701 in FIG. 7 is printed in the presentation mode using the present embodiment.

First, the print job received from the host computer 3000 is processed by the CPU 12 to determine whether the print job includes print data whose property is set by a BIND start command and a BIND end command (step 901). If such print data is detected, printing is performed in accordance with a print property specified by a print setting command following the BIND start command (step 902).

After printing has completed, it is determined whether there is more print data whose print property is specified between a BIND start command and a BIND end command. If no such print data is detected, but a job end command is detected, the printing process is ended. In the case where a print setting command and/or print data is detected although no BIND start command is detected, printing is performed.

As shown in the example depicted in FIG. 7, printing is performed in accordance with the print property specified by the BIND2 command such that 5-page presentation data received from the host computer 3000 is printed and the printed sheets are stapled for each set of documents, as specified.

For print data whose print property is set by the BIND1 command, printing is performed, in step 902, in accordance with a print setting command following the BIND1 start command such that one set copies is made on OHP transparency sheets in the single-sided/no-stapling/no-change-in-layout (Nup=1) mode.

Thus, in the presentation mode according to the present embodiment, as described above, printing is performed in the manner as shown in FIG. 7. That is, 5-page print data 701 received from the host computer 3000 is first printed on OHP transparency sheets as represented by 702 in FIG. 7, and then a specified number of sets of documents for distribution is output in a stapled form as represented by 703 in FIG. 7.

Thus, the present invention provides the information processing apparatus, the method of processing data, the data processing program, and the storage medium including the data processing program stored thereon, which allow a user to print data on both OHP transparency sheets for presentation and sheets for distribution by performing a simple operation. This is very convenient for the user compared with the conventional technique in which printing on OHP transparency sheets and printing on sheets for use of distribution are performed separately.

In a network environment such as a LAN, one printer is usually shared by a plurality of host computers. In this case, print jobs are transmitted to the printer from various host computers. Therefore, when a plurality of print jobs are transmitted from the same host computer, if a print job is transmitted from another host computer between the plurality of print jobs transmitted from the former host computer, a user is required to pick up correct sets of printed documents after completion of the printing operation, which can be troublesome.

In the present embodiment, the above problem can be avoided because print data for printing on OHP transparency sheets and print data for printing on sheets for distribution can be combined into a single print job, and both data are transmitted when the single print job is transmitted from the host computer. This prevents the print job from being disturbed by a print job issued by another host computer. Furthermore, it becomes possible to easily cancel or rearrange jobs. Thus, a further improvement in convenience for users is achieved.

The present embodiment may be modified such that, instead of placing the print data 603 and the print data 606 into a single print job 600 as shown in FIG. 6, the print data 603 and the print data 606 may be divided into different print jobs. That is, if the CPU 1 determines, in step 802 in FIG. 8, that the presentation mode is selected, a job is generated such that the job includes print data and a command to make settings for printing on OHP transparency sheets. Thereafter, in step 804, another job is generated such that the job includes print data and a command to make settings for printing on sheets for distribution.

The two print jobs generated in the above-described manner are then transmitted to the printer 1500 via the interface 21 serving as the data transfer means shown in FIG. 1, and the printer performs printing in accordance with the received print jobs.

In this modified embodiment, unlike the embodiment shown in FIG. 6 in which a job is generated in a special manner, jobs can be generated in a conventional manner and thus a conventional driver may be used. This allows a reduction in cost for design and production.

In the present embodiment, there is no particular limitation on the order in which printing is performed. For example, printing on sheets into a stapled form for distribution may be performed first, and then printing on OHP transparency sheets may be performed. OHP transparency sheets may be fed automatically from a sheet feeder other than a manual-feed tray. In the case where the printer has a sensor for detecting the type of recording media, printing may be controlled depending on whether an OHP transparency sheet or a sheet of standard paper is detected.

In the embodiment described above, printing data is printed on both sides of each sheet for distribution. However, printing may be performed on one side of each sheet. Furthermore, a layout may be specified so that a plurality of pages of print data are printed on one sheet. Furthermore, functions of the printer 1500 may be incorporated to print data in a modified form. Note that all these manners fall within the scope of the present invention.

In the embodiment described above with reference to FIG. 6, the print data 603 and the print data 606 are identical print data generated by the application running on the host computer 3000. The print data 603 and the print data 606 are printed into different formats specified by the BIND command. Of course, the layout may be modified or expanded/reduced by the application running on the host computer. In this case, the print data 603 and the print data 606 may be different from each other. The present invention can also be used in such a case. That is, when the presentation mode is selected, a print job for printing data in a finishing format suitable for printing on OHP transparency sheets and a print job for printing data in a finishing format suitable for printing on sheets for distribution are generated. The printer next performs printing on OHP transparency sheets and sheets for distribution into the formats specified by the jobs. Thus the present invention has no limitation on the format of print data itself.

In the embodiment descried above, the finishing process is performed so as to obtain the copies in the stapled form. However, in the present invention, the finishing process is not limited to stapling. Binding, stamping, folding, or starching may also be performed in the finishing process, if the printer has such a capability.

The present invention may also be applied to a printer which does not have a capability of performing such a finishing process but which has a capability of printing on both sides of a sheet and/or a capability of expanding/reducing the layout. In this case, when the presentation mode is selected, a print job for printing data in a format suitable for printing on OHP transparency sheets and a print job for printing data on sheets for distribution in a format specified by a user are generated. That is, whether or not the printer has the capability of performing a finishing process is not essential to the present invention.

In the embodiment described above, printing in the presentation mode is performed on sheets of standard paper and on OHP transparency sheets. However, documents for distribution and a document for presentation may be printed on the same type of recording sheets. This is useful when a presentation is performed by projecting an image of a presentation document using a direct projector. To this end, the user configuration interface (FIG. 4) may have a capability of selecting the sheet type for presentation type uses, or a capability of selecting one of formats pre-assigned to the respective types of presentation. Herein, the term "sheet type" is synonymous with "media type" which is widely used to describe the material, size, shape, and/or characteristic of media.

With reference to a memory map shown in FIG. 10, a data processing program readable by a printing system including an information processing apparatus according to the present invention is described below.

FIG. 10 is a schematic representation of a memory map of a storage medium for storing various data processing programs readable by the printing system including the information processing apparatus according to the present invention.

Although not shown in the figure, in order to manage the programs stored on the storage medium, information such as version information or the producers information of the programs may also be stored. Information stored on the storage medium may also include information such as icon information that can be read and displayed by an OS which reads the programs so that a user can identify the respective programs.

Data associated with programs are also managed in the directory. Furthermore, in some cases, a program for installing a program into a computer is also stored. In the case where a program to be installed is stored in a compressed form, a program for decompressing the compressed program may also be stored.

The functions of the present embodiment may be implemented by a program which is installed into the host computer from the outside. In this case, information including the program according to the present invention may be supplied to an output device from a storage medium such as a CD-ROM, a flush memory, or a FD, or from an external storage medium via a network.

Furthermore, the objects of the present invention may also be achieved by supplying a storage medium, on which a software program implementing the functions of any of the embodiments described above is stored, to a system or an apparatus whereby a computer (CPU or MPU) in the system or apparatus reads and executes the program code stored on the storage medium.

In this case, it should be understood that the program code read from the storage medium implements the functions of the present invention and thus the storage medium storing the program code falls within the scope of the present invention.

Storage media which can be preferably employed in the present invention to supply the program code include a floppy disk, hard disk, optical disk, magneto-optical disk, CD-ROM, CD-R, magnetic tape, non-volatile memory card, and ROM.

Furthermore, the scope of the present invention includes not only such a system in which the functions of any embodiment described above are implemented simply by reading and executing a program code on a computer but also a system in which a part of or the whole of process instructed by the program code is performed using an OS (operating system) on the computer.

Furthermore, the scope of the present invention also includes a system in which program code is transferred once from a storage medium into a memory provided in a function extension board inserted in a computer or provided in a function extension unit connected to the computer, and then a part of or the whole of process instructed by the program code is performed by a CPU or the like in the function extension board or the function extension unit thereby implementing the functions of any embodiment described above.

Although in the present embodiment, the external memory 11 is employed as the medium for storing the printing program executed by the host computer, another type of storage medium such as a FD, a hard disk (HDD), a CD-ROM, or an IC memory card may also be employed. The printing program are stored, singly or together with an OS or another program executable by the host computer, in the ROM 3 so as to form a part of the memory map, and the printing program may be executed directly by the CPU 1.

As described above, the present invention allows a user to obtain copies printed in desired different formats by performing a setting operation only once without having to further perform a complicated operation. Thus, the invention provides an improved operability.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information processing apparatus for generating print data to be printed by a printer, the information processing apparatus comprising:
   a setting unit adapted to set a print property specifying a manner in which the print data is to be printed via a printer driver;
   a special-printing-mode specification unit adapted to specify a special printing mode;
   a print property information generator adapted to generate print property information; and
   a job generator adapted to generate a print job interpretable by a printer, the print job including the print data and the print property information,
   wherein, when the special printing mode is not selected, the print property information generator generates, in accordance with the print property set by the setting unit, first print property information specifying a manner in which printing is performed on a first recording sheet, whereas when the special printing mode is selected, the print property information generator automatically generates, in addition to the first print property information, second print property information specifying a manner in which printing is performed on a second recording sheet, the second print property information being generated in accordance with a print property different from the print property set by the setting unit,
   wherein the print property information in the print job generated by the job generator is further defined as the information regarding an output format property, and
   wherein, when the special printing mode is selected, the job generator generates a single print job including a first group of commands indicating an output format property based on the first print property information and first print data and a second group of commands indicating an output format property based on the second print property information and second print data.

2. An information processing apparatus according to claim 1, wherein the first recording sheet and the second recording sheet are of the same sheet type.

3. An information processing apparatus according to claim 1, wherein the first recording sheet is opaque and the second recording sheet is transparent.

4. An information processing apparatus according to claim 1, wherein the special printing mode is a presentation mode, the first print property information includes print property information describing a property associated with a printing process for creating a copy for a distribution, and the second print property information is print property information describing a property associated with a printing process for creating a copy for a presentation.

5. An information processing apparatus according to claim 1, wherein a finishing process of the printing performed based on the information regarding the output format property is one of a binding process of a plurality of recording sheets, a folding process for folding a recording sheet, a punching process for punching a hole in a recording sheet, and a layout process for determining a layout in which data is printed on a recording sheet.

6. An information processing apparatus according to claim 5, wherein, when the special printing mode is selected, a printing is, regardless of the print property set by the setting unit, automatically set not to perform the finishing process when the printing on the second recording sheet is performed.

7. An information processing apparatus according to claim 6, wherein the first print data and the second print data are identical data.

8. An information processing apparatus according to claim 6, wherein the first print data and the second print data are different from each other, one of which being print data obtained by a layout process, an expanding process or a reducing process performed by the printer driver.

9. A method for processing data by an information processing apparatus to generate print data to be printed by a printer, the method comprising:
   a setting step for setting a print property specifying a manner in which the print data is to be printed via a printer driver;
   a special-printing-mode specifying step for specifying a special printing mode;
   a print property information generating step for generating print property information; and
   a job-generating step for generating a print job interpretable by a printer, the print job including the print data and the print property information,
   wherein, when the special printing mode is not selected, first print property information specifying a manner in which printing is performed on a first recording sheet is generated in accordance with the print property set in the setting step, whereas when the special printing mode is selected, second print property information specifying a manner in which printing is performed on a second recording sheet is automatically generated in addition to the first print property information, the second print property information being generated in accordance with a print property different from the print property set in the setting step, wherein the print property information in the print job generated by the job generator is further defined as the information regarding an output format property, and wherein, when the special printing mode is selected, the job generator generates a single print job including a first group of commands indicating an output format property based on the first print property information and first print data, and a second group of commands indicating an output format property based on the second print property information and second print data.

10. A method for processing data according to claim 9, wherein the first recording sheet and the second recording sheet are of the same sheet type.

11. A method for processing data according to claim 9, wherein the first recording sheet is opaque and the second recording sheet is transparent.

12. A method for processing data according to claim 9, wherein the special printing mode is a presentation mode, the first print property information is print propery information describing a property associated with a printing process for creating a copy for a distribution, and the second print property information is print property information describing a property associated with a printing process for creating a copy for a presentation.

13. An information processing method according to claim 9, wherein a finishing process of the printing performed based on the information regarding the output format property is one of a binding process of a plurality of recording sheets, a folding process for folding a recording sheet, a punching process for punching a hole in a recording sheet, and a layout process for determining a layout in which data is printed on a recording sheet.

14. An information processing method according to claim 13, wherein, when the special printing mode is selected, a printing is, regardless of the print property set in the setting step, automatically set not to perform the finishing process when the printing on the second recording sheet is performed.

15. An information processing apparatus according to claim 14, wherein the first print data and the second print data are identical data.

16. An information processing apparatus according to claim 14, wherein the first print data and the second print data are different from each other, one of which being print data obtained by a layout process, an expanding process or a reducing process performed by the printer driver.

17. A computer-readable medium including instructions executable by an information processing apparatus to generate print data to be printed by a printer, the computer-readable medium including the instructions of:

a setting step for setting a print property specifying a manner in which the print data is to be printed;

a special-printing-mode specifying step for specifying a special printing mode; and a print property information generating step for generating print property information;

a job-generating step for generating a print job interpretable by a printer, the print job including the print data and the print property information, wherein, when the special printing mode is not selected, first print property information specifying a manner in which printing is performed on a first recording sheet is generated in accordance with the print property set in the setting step, whereas when the special printing mode is selected, second print property information specifying a manner in which printing is performed on a second recording sheet is automatically generated in addition to the first print property information, the second print property information being generated in accordance with a print property different from the print property set in the setting step, wherein the print property information in the print job generated by the job generator is further defined as the information regarding an output format property, and wherein, when the special printing mode is selected, the job generator generates a single print job including a first group of commands indicating an output format property based on the first print property information and first print data, and a second group of commands indicating an output format property based on the second print property information and second print data.

18. A computer-readable medium according to claim 17, wherein the first recording sheet and the second recording sheet are of the same sheet type.

19. A computer-readable medium according to claim 17, wherein the first recording sheet is opaque and the second recording sheet is transparent.

20. A computer-readable medium according to claim 17, wherein a finishing process of the printing performed based on the information regarding the output format property is one of a binding process of a plurality of recording sheets, a folding process for folding a recording sheet, a punching process for punching a hole in a recording sheet, and a layout process for determining a layout in which data is printed on a recording sheet.

21. A computer-readable medium according to claim 20, wherein, when the special printing mode is selected, a printing is, regardless of the print property set in the setting step, automatically set not to perform the finishing process when the printing on the second recording sheet is performed.

22. A computer-readable medium according to claim 21, wherein the first print data and the second print data are identical data.

23. A computer-readable medium according to claim 21, wherein the first print data and the second print data are different from each other, one of which being print data obtained by a layout process, an expanding process or a reducing process performed by the printer driver.

* * * * *